US007240766B2

(12) United States Patent
Rogers et al.

(10) Patent No.: US 7,240,766 B2
(45) Date of Patent: Jul. 10, 2007

(54) SOUND DAMPENING PAD

(75) Inventors: Brandon Rogers, Canton, NC (US); Darren R. McCracken, Clyde, NC (US)

(73) Assignee: Day International, Inc., Arden, NC (US)

( * ) Notice: Subject to any disclaimer, the term of this patent is extended or adjusted under 35 U.S.C. 154(b) by 85 days.

(21) Appl. No.: 10/757,229

(22) Filed: Jan. 14, 2004

(65) Prior Publication Data

US 2004/0222039 A1 Nov. 11, 2004

Related U.S. Application Data

(62) Division of application No. 10/429,465, filed on May 5, 2003, now Pat. No. 6,732,648.

(51) Int. Cl.
*B41F 13/10* (2006.01)
*F16F 15/10* (2006.01)
*F16F 15/00* (2006.01)

(52) U.S. Cl. ...................... 181/209; 181/207; 101/375; 101/217

(58) Field of Classification Search ........ 181/207–209, 181/205, 201; 101/375, 376, 378, 382.1, 101/383, 415.1, 217; 188/379, 378; 285/49; 248/561
See application file for complete search history.

(56) References Cited

U.S. PATENT DOCUMENTS

| | | | | |
|---|---|---|---|---|
| 650,290 | A * | 5/1900 | Wirt | 181/207 |
| 2,278,083 | A * | 3/1942 | Lowe | 206/521 |
| 3,160,549 | A * | 12/1964 | Caldwell et al. | 181/207 |
| 3,386,527 | A * | 6/1968 | Daubert et al. | 181/208 |
| 3,692,335 | A * | 9/1972 | Vickers et al. | 181/200 |
| 3,998,347 | A | 12/1976 | Mahl | |
| 4,023,651 | A * | 5/1977 | Healiss | 181/207 |
| 4,089,265 | A * | 5/1978 | White et al. | 101/375 |
| 4,130,972 | A * | 12/1978 | Varlonga | 52/241 |
| 4,331,214 | A * | 5/1982 | Darby | 181/208 |
| 4,516,658 | A * | 5/1985 | Scarton et al. | 181/208 |
| 4,517,233 | A * | 5/1985 | Weichman | 428/108 |
| 4,660,229 | A | 4/1987 | Harris | |
| 4,793,020 | A * | 12/1988 | Stratton et al. | 181/209 |
| 4,840,001 | A * | 6/1989 | Kimisawa | 52/208 |
| 4,899,846 | A * | 2/1990 | Furuta et al. | 181/210 |
| 4,932,923 | A * | 6/1990 | Thompson | 464/131 |
| 5,009,947 | A * | 4/1991 | McManus et al. | 428/122 |
| 5,150,943 | A * | 9/1992 | Gold | 296/201 |
| 5,215,013 | A * | 6/1993 | Vrotacoe et al. | 101/217 |
| 5,319,883 | A * | 6/1994 | Gueneau et al. | 49/489.1 |

(Continued)

FOREIGN PATENT DOCUMENTS

| | | |
|---|---|---|
| WO | WO/97/47664 | 12/1997 |

*Primary Examiner*—Edgardo San Martin
(74) *Attorney, Agent, or Firm*—Dinsmore & Shohl LLP

(57) ABSTRACT

An easy to manufacture and install sound dampening pad for a printing blanket sleeve is provided. The pad effectively attenuates noise emanating from the sleeve during air pressurized mounting and dismounting of the blanket sleeve to an underlying cylinder. The sound dampening pad is fabricated from a flexible polymeric material and in one embodiment has a generally J-shaped configuration with inner and outer surfaces. At least a portion of the inner surface of the J-shaped configuration includes a pressure sensitive adhesive thereon to secure the pad to the inner surface of the sleeve.

9 Claims, 4 Drawing Sheets

U.S. PATENT DOCUMENTS

| | | | | |
|---|---|---|---|---|
| 5,323,787 | A * | 6/1994 | Pratt | 128/862 |
| 5,441,685 | A * | 8/1995 | Miyakawa et al. | 264/148 |
| 5,745,968 | A | 5/1998 | Genest et al. | |
| 5,858,509 | A * | 1/1999 | Polch et al. | 181/207 |
| 6,112,848 | A * | 9/2000 | Ang et al. | 181/207 |
| 6,347,586 | B1 * | 2/2002 | Boucher et al. | 101/382.1 |
| 6,634,294 | B2 | 10/2003 | Boucher et al. | |
| 6,732,648 | B1 * | 5/2004 | Rogers et al. | 101/375 |
| 6,938,548 | B1 * | 9/2005 | Cormier et al. | 101/480 |

* cited by examiner

SOUND DAMPENING PAD

CROSS REFERENCE TO RELATED APPLICATIONS

This application is a division of U.S. patent application Ser. No. 10/429,465, filed May 5, 2003, now U.S. Pat. No. 6,732,648, issued May 11, 2004.

BACKGROUND OF THE INVENTION

The present invention is directed to printing sleeves for offset or flexographic printing, and more particularly to printing sleeves having a sound dampening feature that attenuates noise during mounting and dismounting of the sleeve from a support cylinder.

An offset printing unit has a plurality of rotatable cylinders, including at least one plate cylinder and at least one corresponding blanket cylinder. The plate cylinder carries a printing plate having a surface on which an inked image is defined. The blanket cylinder carries a printing blanket. The plate on the plate cylinder transfers the inked image to the blanket on the blanket cylinder at a nip between the plate cylinder and the blanket cylinder when the cylinders rotate. The blanket on the blanket cylinder subsequently transfers the inked image to the material being printed, such as a web of paper.

Printing blankets have conventionally been formed as flat sheets which are then mounted on a blanket cylinder by wrapping the sheet around the blanket cylinder. More recently, printing blankets in the form of hollow tubular sleeves have become more prevalent. Such sleeves are mounted on a blanket cylinder by sliding the sleeve telescopically over the blanket cylinder. The sleeve and the blanket cylinder are designed so that the sleeve is receivable over the blanket cylinder with an interference fit.

The blanket cylinder is equipped with air flow passages and openings to direct a pressurized flow of air over the blanket cylinder. When the sleeve is located over the air flow openings in the blanket cylinder, the pressurized flow of air expands the sleeve diametrically. The expanded sleeve can be moved axially onto, or off of, the blanket cylinder when in its expanded condition. When the pressure is relieved, the sleeve contracts diametrically against the blanket cylinder and thus establishes an interference fit with the blanket cylinder. Flexographic printing sleeves have also been developed and are mounted onto and dismounted from support cylinders in much the same manner as offset sleeves.

One problem with such sleeves is that the compressed air that is used in mounting and dismounting the sleeves from the cylinders can create a whistle or other loud noise during the procedure. The sleeve ends may also vibrate causing additional noise to emanate during mounting and dismounting. In some instances, press operators may need to don ear protection gear to avoid injury. One solution to the problem has been proposed by Vrotacoe et al, U.S. Pat. No. 5,215,013. Vrotacoe et al describe a blanket sleeve having a damping ring made of a resinous material that is adhered to the interior wall of the sleeve near and end thereof. The ring is designed to reduce vibrations caused by the flow of pressurized air and attenuate-noise associated with mounting and dismounting of the sleeves.

Another solution has been proposed by Boucher et al, U.S. Pat. No. 6,347,586 B1. Boucher et al adhere a sound dampening material on the outer surface of the blanket cylinder such that the material engages the interior wall of the printing sleeve during mounting and dismounting thereof. The preferred material for use is a non-woven, fibrous material such as the "hook" portion of a VELCRO® closure.

However, the proposed solutions have not been entirely successful in solving the problem. Accordingly, there remains a need in the art for a printing sleeve having a sound dampening feature that attenuates noise during mounting and dismounting of the sleeve from a support cylinder.

SUMMARY OF THE INVENTION

The present invention meets the need in the art by providing an easy to manufacture and install sound dampening pad for a printing blanket sleeve that effectively attenuates noise emanating from the sleeve during air pressurized mounting and dismounting thereof.

In accordance with one aspect of the present invention, a printing blanket sleeve for mounting onto an underlying cylinder using a pressurized flow of air through at least one flow opening in said cylinder is provided. The sleeve comprises a cylindrical base having first and second ends and at least one additional layer on the base having a printing surface. As is typical in this art, the blanket sleeve may include additional reinforcing, stabilizing, and/or compressible layers. The sleeve base has an inside diameter that is less than the diameter of the underlying cylinder but which is expandable under the influence of pressurized air such that the inside diameter of the sleeve base temporarily has a diameter that is greater than the diameter of the underlying cylinder.

The printing blanket sleeve includes a sound dampening pad mounted on at least one of the ends of the printing blanket sleeve for attenuating noise associated with the mounting and dismounting of the printing blanket sleeve. The sound dampening pad comprises a flexible material extending around substantially the inner circumference of the sleeve base and over an end of the printing blanket sleeve.

In a preferred form, the sound dampening pad has a generally J-shaped configuration, in which the inner radius of the "J" is in contact with the inner circumference of the sleeve base and an outer surface of an end of the sleeve. Generally, the shorter leg of the "J" has a thickness that is less than the overall thickness of the printing blanket. Also, the longer leg of the "J" is not so long as will interfere with the end of the blanket cylinder onto which the blanket sleeve is mounted. A suitable thickness for the legs of the sound dampening pad is from about 0.03 to about 0.05 inches (0.76 to about 1.27 mm), and most preferably about 0.042 inches (1.07 mm).

The sound dampening pad may be comprised of natural or synthetic rubber or a thermoplastic polymer having the requisite flexibility for installation of the pad. In a preferred form, the sound dampening pad includes an adhesive on an inner surface thereof to secure the pad to the printing blanket sleeve. In one embodiment, the adhesive is a pressure sensitive adhesive in the form of a double-sided adhesive tape.

In accordance with another aspect of the invention, a sound dampening pad is provided and comprises a flexible polymeric material having a generally J-shaped configuration and inner and outer surfaces. At least a portion of the inner surface of the J-shape includes a pressure sensitive adhesive thereon. Preferably, the sound dampening pad comprises natural or synthetic rubber or a thermoplastic polymer having the requisite flexibility for mounting it in the sleeve.

In a preferred form, the pressure sensitive adhesive comprises a double-sided adhesive tape in which the exposed surface of the double-sided adhesive tape includes a release liner thereon. In another embodiment, the double-sided adhesive tape includes a foam core.

In accordance with another embodiment of the invention, a method for mounting a sound dampening pad to a printing blanket sleeve is provided. The method comprises providing a sound dampening pad comprising a flexible polymeric material having a generally J-shaped configuration and inner and outer surfaces with at least a portion of the inner surface of the J-shape including a pressure sensitive adhesive thereon, adhering the inner surface of the sound dampening pad to the inner surface of the printing blanket sleeve such that the sound dampening pad extends substantially about the inner circumference of the sleeve and over the end of the sleeve.

In a preferred form, the sound dampening pad is in the form of a length of material and the pad is cut to have a length of substantially the inner diameter of the sleeve prior to installation. Preferably, the inner radius of the J-shaped configuration is placed in contact with the inner circumference of the base and an outer surface of an end of the sleeve and secured thereto. The sound dampening pad provides the additional advantages of aiding in the installation of the blanket sleeve. The edges of the pad overlap the sharp edge of the base of the sleeve and provide protection to an operator's hands as the sleeve is pushed onto and pulled off of the cylinder.

Accordingly, it is a feature of the present invention to provide an easy to manufacture and install sound dampening pad for a printing blanket sleeve that effectively attenuates noise emanating from the sleeve during air pressurized mounting and dismounting thereof. Other features and advantages of the invention will become apparent from the following detailed description, the accompanying drawings, and the appended claims.

BRIEF DESCRIPTION OF THE DRAWINGS

The following detailed description of the embodiments of the present invention can be best understood when read in conjunction with the following drawings, where like elements are indicated with like reference numerals, and in which.

DETAILED DESCRIPTION OF THE PREFERRED EMBODIMENTS

Figure 1:
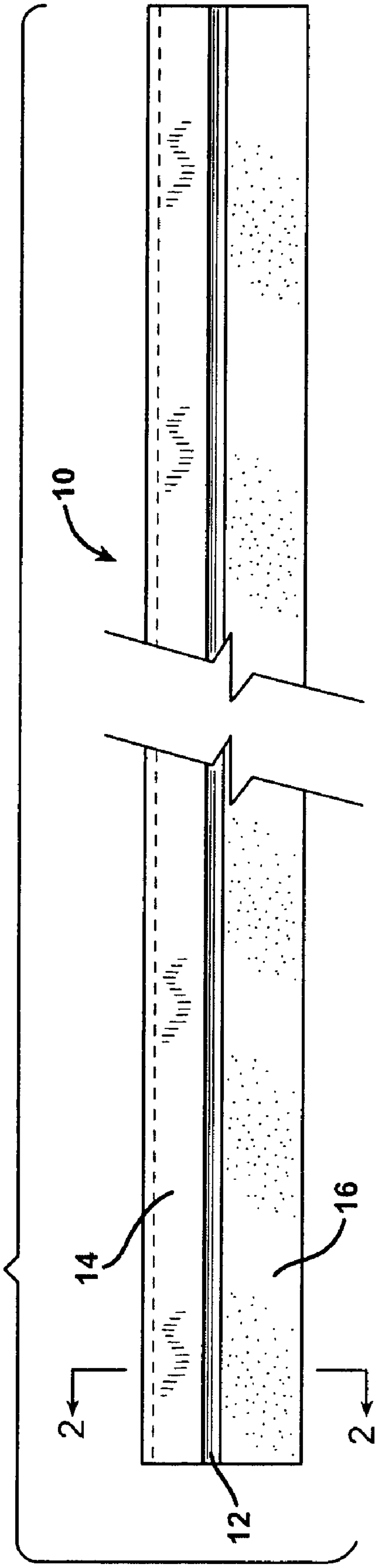
FIG. 1 is a front elevational view of an embodiment of the sound dampening pad of the present invention.
Figure 2:
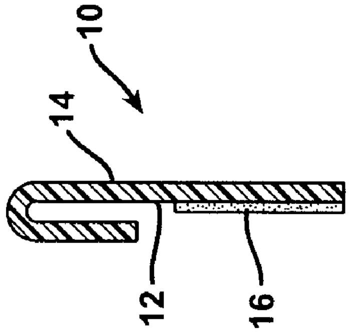
FIG. 2 is a side view of the sound dampening pad of FIG. 1.
Figure 6:
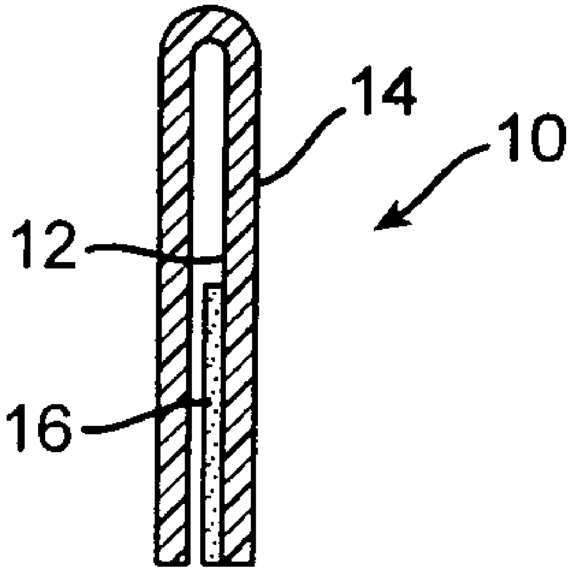
FIG. 6 is a side view of an alternative embodiment of the sound dampening pad.

An embodiment of the sound dampening pad is shown in FIGS. 1 and 2. The pad 10 comprises an elongated strip of a flexible polymeric material such as natural or synthetic rubber or a thermoplastic polymer. Pad 10 has a "J-shaped" configuration as best seen in FIG. 2 having inner 12 and outer 14 surfaces. As can be seen, inner surface 12 comprises the inner radius of the J-shaped configuration and outer surface 14 comprises the outer radius. It will be apparent that pad 10 may have other cross-sectional shapes including a U-shape such as the pad illustrated in FIG. 6. Pad 10 may be formed by any suitable method such as casting, molding, or extrusion. Pad 10 may be supplied in an indeterminate length and cut to size as needed. In this way, the pad can be installed on sleeves having varying diameters.

An adhesive 16 is positioned on inner surface 12 of the pad. In a preferred form, adhesive 16 comprises a double-sided adhesive tape. The tape may include a foam core with pressure sensitive adhesive coated onto both surfaces thereof. The adhesive tape may include a release liner on the exposed surface of the tape that protects the adhesive until the pad is installed. A suitable adhesive tape is a 20 mil thick (0.5 mm), ⅜ inch wide (9.5 mm) transfer tape available from 3M.

Figure 3:
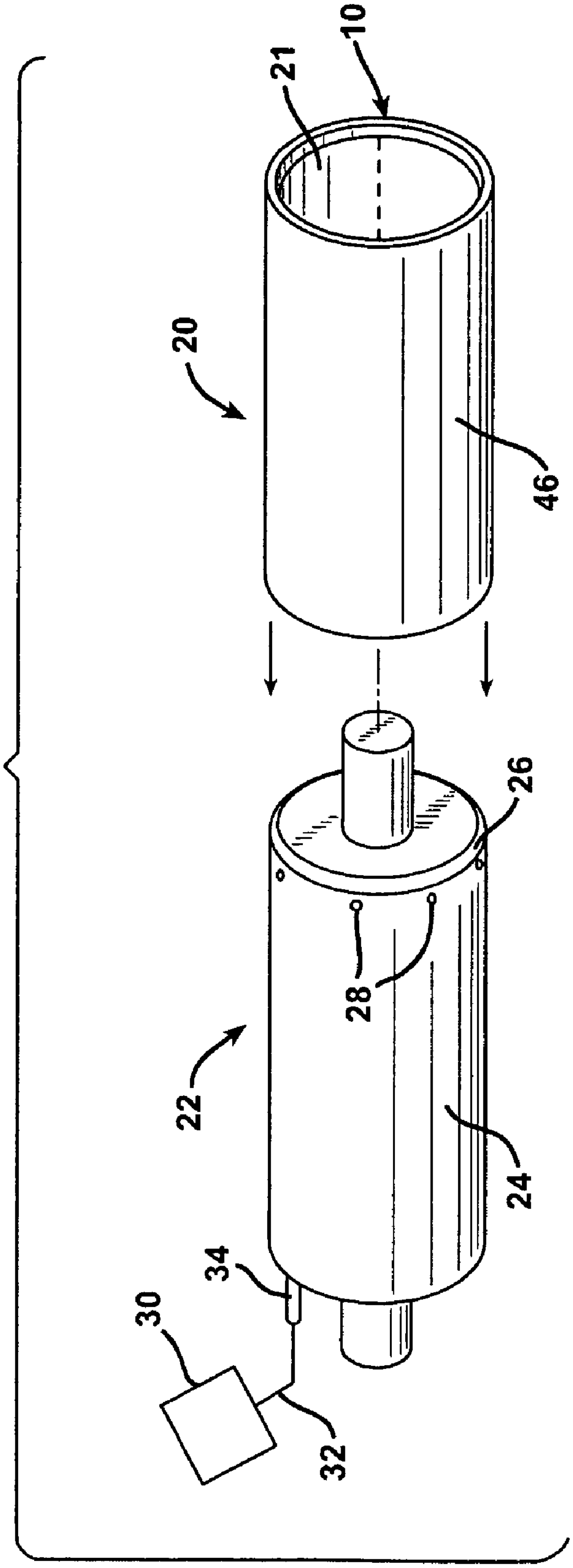
FIG. 3 is a perspective view of a printing blanket sleeve that is adapted to be mounted onto an underlying blanket cylinder, the printing sleeve includes a sound dampening pad on one end thereof.
Figure 4:
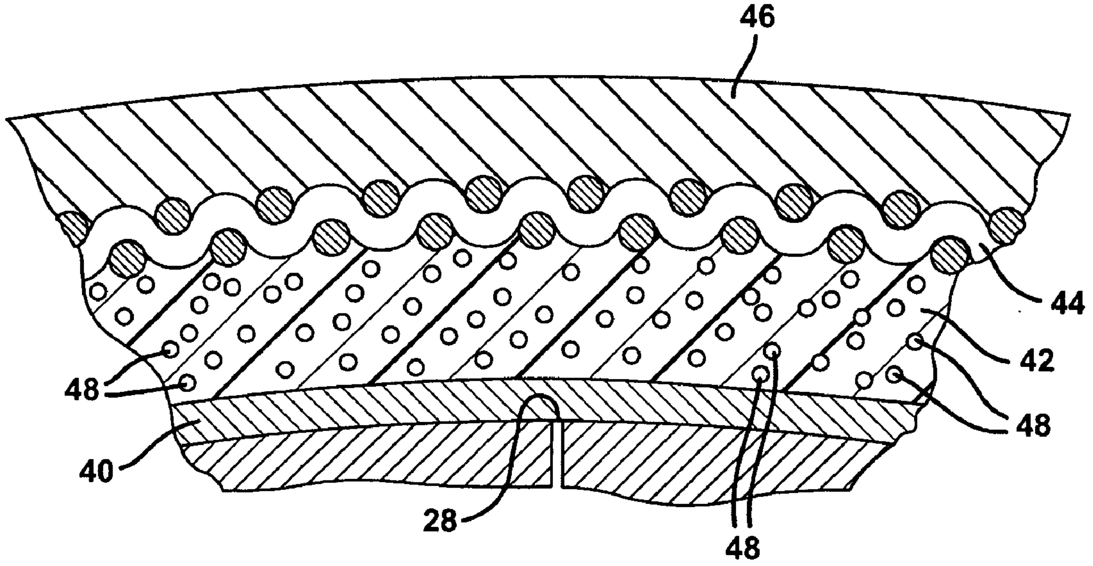
FIG. 4 PRIOR ART
FIG. 4 is a enlarged sectional view showing a printing blanket sleeve mounted onto a blanket cylinder.

As shown in FIGS. 3 and 4, sound dampening pad 10 is adapted to be installed onto at least one of the ends of printing blanket sleeve 20. As is conventional in the art, sleeve 20 is designed to provide an interference fit with cylinder 22. Because the outer surface 24 has a diameter that is slightly greater than the inside diameter of sleeve 20, sleeve 20 must expand as it is moved in the directions of the arrows in FIG. 3 against a chamfered edge surface 26.

As the inner surface of sleeve 20 is moved over air flow orifices 28 on the end of cylinder 22, air pressure is supplied from a source 30 through line 32 and into inlet 34. Internally-located air flow lines (not shown) connect with the orifices 28 as is conventional in this art. The air pressure causes sleeve 20 to expand as it is mounted axially onto cylinder 22. Once sleeve 20 has been completely mounted, the flow of air is stopped, and sleeve 20 contracts against outer surface 24 to provide a snug interference fit. Pad 10 serves to protect an operator's hands during mounting and dismounting of the blanket sleeve by covering the sharp edges of the sleeve base. This permits the operator to push against the end of the sleeve during installation because the pad provides a soft, flexible surface against which to push or pull the sleeve.

Sleeve 20 can be subsequently removed, such as for replacement or repair, by reversing the process. That is, pressurized air is supplied again to air flow orifices 28 causing the inner diameter of sleeve 20 to expand sufficiently so that is can be slid off of cylinder 22 and dismounted. The base layer of sleeve 20 is selected such that it will provide the requisite expansion under appropriate air pressure (typically about 80–120 psi).

The construction of sleeve 20 is unimportant to the invention. However, for sake of completeness, FIG. 4 illustrates, in an enlarged sectional view, typical layers that may be found on typical printing sleeves in this art. For example, sleeve 20 as shown includes a base 40, a compressible layer 42 overlying base 40, a reinforcing layer of a woven fabric 44, and a print surface layer 46. Typically, base 40 can comprise a thin layer of nickel. Alternatively, base 40 may comprise a polymer resin reinforced with glass, metal, or aramid fibers.

Compressible layer 42 is typically formed of an elastomer and includes voids 48 so that the sleeve is volume compressible during printing. The voids may be formed by any of a number of processes known in the art including the introduction of hollow microspheres into the elastomer during manufacture of the blanket sleeve. Print surface layer 46 is typically formed of a rubber such as nitrile rubber and is designed to accept an inked image from a print cylinder (not shown).

As shown in FIG. 4, air under pressure is forced through orifices 28 on outer surface 24 of cylinder 22 to cause radial expansion of sleeve 20. Once the sleeve is mounted and the air flow terminated, sleeve 20 provides a snug interference fit on cylinder 22.

As sleeve 20 is expanded during mounting and dismounting operations, the pressurized flow of air between outer surface 24 of cylinder 22 and the inner surface of sleeve 20 causes the sleeve to vibrate. These vibrations in turn create noise. Sound dampening pad 10 is provided to attenuate the noise by damping the vibrations that arise when the sleeve is being mounted or dismounted.

Figure 5:
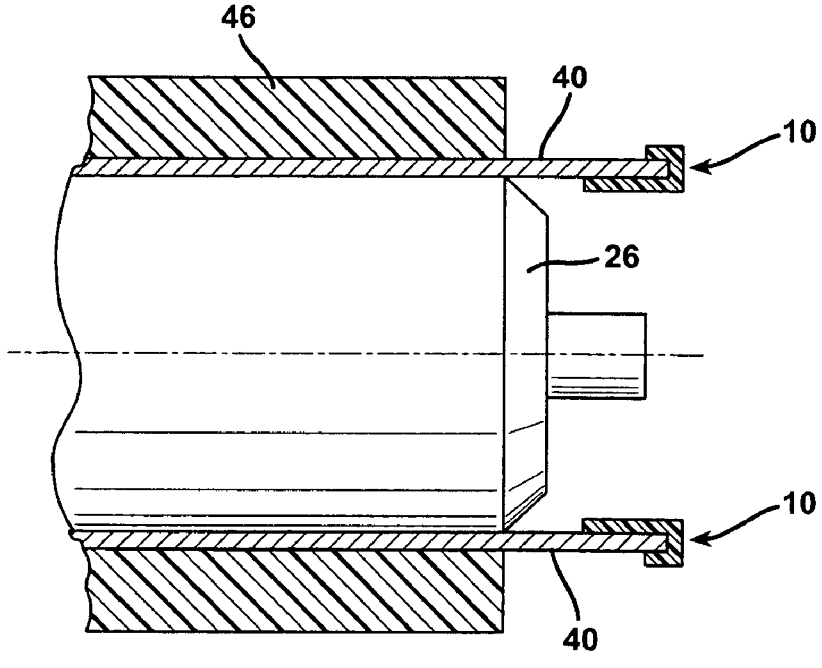
FIG. 5 is a sectional view showing an end of a printing blanket sleeve with a sound dampening pad installed.

As best shown in FIG. 5, pad 10 is mounted onto an end of sleeve 20 such that the longer leg of the J-shaped configuration is applied to the inner surface 21 using adhesive 16 to secure the pad to the sleeve. The shorter leg of the J-shaped configuration extends over the end edge of sleeve base 40 and around to the outer surface thereof. As shown, the shorter leg on the "J" preferably has a total thickness less than the overall thickness of the blanket sleeve.

As also shown in FIG. 5, the longer leg of the "J" that is designed to fit around the inner circumference of the sleeve, preferably has a length such that it will not interfere with the end of cylinder 22. Typically, the pad has a thickness of from between about 0.030 to about 0.050 inches (0.76 to about 1.27 mm), and most preferably about 0.042 inches (1.07 mm). Pad 10 is designed such that when installed it extends substantially completely around the inner circumference of base 40.

Sound dampening pad 10 thus substantially reduces the vibrations and accompanying noise associated with the mounting and dismounting of blanket sleeve 20. Because the pad produces a snug fit on both surfaces and the end edge of sleeve base 40, vibrations, and the sound resulting therefrom, are substantially reduced.

The invention having been described with respect to preferred embodiments, it will be apparent that the invention is not limited to just those embodiments shown but may be varied or modified and still be within the scope of the invention.

What is claimed is:

1. A sound dampening pad comprising a strip of flexible polymeric material having a finite length, a generally curved J-shaped configuration when viewed from an end thereof, and inner and outer surfaces, said inner surface comprising the inner radius of said J-shaped configuration and said outer surface comprising the outer radius of said J-shaped configuration, at least a portion of said inner surface of said J-shaped configuration including a pressure sensitive adhesive thereon.

2. A sound dampening pad as claimed in claim 1 in which said sound dampening pad comprises natural or synthetic rubber or a thermoplastic polymer.

3. A sound dampening pad as claimed in claim 1 in which said pressure sensitive adhesive comprises a double-sided adhesive tape.

4. A sound dampening pad as claimed in claim 3 in which the exposed surface of said double-sided adhesive tape includes a release liner thereon.

5. A sound dampening pad as claimed in claim 4 in which said double-sided adhesive tape includes a foam core.

6. A sound dampening pad as claimed in claim 1 in which said pressure sensitive adhesive is mounted on the longer leg of said J-shaped configuration.

7. A sound dampening pad as claimed in claim 6 in which the shorter leg of said J-shaped configuration has a length such that said shorter leg does not extend to said pressure sensitive adhesive.

8. A sound dampening pad comprising a strip of flexible polymeric material having a finite length, a generally curved J-shaped configuration when viewed from an end thereof, and inner and outer surfaces, said inner surface comprising the inner radius of said curved configuration and said outer surface comprising the outer radius of said curved configuration, at least a portion of said inner surface of said curved configuration including a pressure sensitive adhesive thereon.

9. A sound dampening pad as claimed in claim 8 in which said curved configuration comprises a U-shaped configuration.

* * * * *